(12) United States Patent
Parker

(10) Patent No.: US 7,188,996 B2
(45) Date of Patent: Mar. 13, 2007

(54) EXPIRATION INDICATOR

(76) Inventor: Robert Parker, 60617 Golf Village Loop, Bend, OR (US) 97702

( * ) Notice: Subject to any disclaimer, the term of this patent is extended or adjusted under 35 U.S.C. 154(b) by 0 days.

(21) Appl. No.: 10/885,217

(22) Filed: Jul. 1, 2004

(65) Prior Publication Data

US 2006/0002448 A1 Jan. 5, 2006

(51) Int. Cl.
*G01K 3/02* (2006.01)
*G01K 1/12* (2006.01)
*G01K 7/22* (2006.01)

(52) U.S. Cl. .................... 374/106; 374/162; 374/141; 374/102; 374/183

(58) Field of Classification Search ............... 374/103, 374/159, 106, 102, 104, 162, 183, 141
See application file for complete search history.

(56) References Cited

U.S. PATENT DOCUMENTS

| | | | | |
|---|---|---|---|---|
| 3,874,240 A * | 4/1975 | Rembaum | .................... | 374/162 |
| 4,006,414 A * | 2/1977 | Parker | ........................ | 324/106 |
| 4,702,564 A * | 10/1987 | Parker | ........................ | 349/199 |
| 4,726,661 A * | 2/1988 | Parker | ........................ | 349/199 |
| 4,805,188 A * | 2/1989 | Parker | ........................ | 374/141 |
| 4,835,475 A * | 5/1989 | Hanakura et al. | ........... | 324/435 |
| 5,128,616 A * | 7/1992 | Palmer | ...................... | 324/435 |
| 5,188,231 A * | 2/1993 | Kivell et al. | ................ | 206/705 |
| 5,416,406 A * | 5/1995 | Jette | ............................. | 324/94 |
| 5,557,208 A * | 9/1996 | Parker | ........................ | 324/435 |
| 5,841,285 A * | 11/1998 | Bailey | ........................ | 324/435 |
| 5,925,480 A * | 7/1999 | Shacklett et al. | ............. | 429/93 |
| 6,048,572 A * | 4/2000 | Shacklett et al. | ............. | 427/58 |
| 6,103,351 A * | 8/2000 | Ram et al. | ................ | 428/195.1 |
| 6,152,597 A * | 11/2000 | Potega | ........................ | 374/185 |
| 6,382,125 B1 * | 5/2002 | Tamura | ...................... | 116/207 |
| 6,722,782 B2 * | 4/2004 | Faries et al. | ................. | 374/162 |
| 6,787,108 B2 * | 9/2004 | Ribi | ............................. | 422/58 |
| 6,822,931 B2 * | 11/2004 | Braunberger | ................ | 368/327 |
| 6,916,130 B1 * | 7/2005 | Holt et al. | ............. | 400/120.01 |
| 2003/0223474 A1 * | 12/2003 | Roepke | ...................... | 374/152 |
| 2005/0155985 A1 * | 7/2005 | Meyer | ...................... | 222/146.2 |

FOREIGN PATENT DOCUMENTS

JP 02152189 A * 6/1990

* cited by examiner

*Primary Examiner*—Gail Verbitsky

(57) ABSTRACT

A simple recording device using a stable electric resistance heater in thermal contact with an irreversible color changing time temperature material relatively insensitive to room temperatures to show and record the cumulative time an electrical appliance, battery, tool, instrument has been used.

The device may use a plurality of thick film carbon printed resistive heater with a thermal gradient in contact with the time temperature material or a simple adhesive calibrated time temperature film on a surface mounted stable resistor. The indicator is in parallel or series with the power switch.

The time temperature material is in thermal contact with a constant temperature heater when used in fluctuating ambient temperature conditions.

2 Claims, 3 Drawing Sheets

$Log\ t = K\ Log\ Temp.$  FIG 8

EXPIRATION INDICATOR

EXPIRATION INDICATOR

BACKGROUND OF THE INVENTION

1. Technical Field of the Invention

Many electrical appliances, such as blenders, mixers, vacuum cleaners, etc. have a limited warranty from the date of purchase, perhaps ninety-days or one year. This is also true for battery-operated tools, such as drills, saws, sanders, etc. However, in some instances, continuous use may cause failure within the warranty period, thus causing the manufacturer to replace the item prematurely.

Rechargeable batteries used in many appliances and tools have a limited number of recharge cycles before they degrade and fail. It would be useful to determine with some inexpensive indicator when the batteries are nearing the end of their rechargeable life.

There are also electrical instruments that should be recalibrated or checked after a certain number of hours of use. Also, it would be desirable to know how much energy has been expended when using large storage batteries. For these and many other applications, it is desirable to have an inexpensive passive device that both senses the cumulative usage and visually displays, in an irreversible manner the expiration time.

2. Description of the Prior Art

U.S. Pat. No. 4,702,564 teaches the use of a printed tapered bow tie-shaped resistive heating element using silver, silver/carbon conductive inks in thermal contact with an irreversible polyacetylinic material in series with a battery to measure the remaining life in a battery. It also teaches that this device may be used to measure when the warranty on some electrical appliances has been exceeded.

However, it was determined that the thin tapered bow tie or wedge-shaped heater design using conductive silver or silver carbon mixes would, over a period of time at elevated temperatures, degrade and fail. The heaters were unstable and used too much energy.

The instability of the bow tie-shaped wedge silver and silver carbon battery tester is disclosed in U.S. Pat. No. 5,128,616. Here the inventor found the thin section "burned out." U.S. Pat. No. 5,128,616 discloses a nine-volt battery tester using parallel silver conductive Buss bars connecting adjoining squares of printed carbon heater elements in thermal contact with a reversible thermochromic material.

While this configuration places a significant load on the nine-volt battery tester, it is inefficient and wasteful of both materials and energy as the large carbon rectangular heater elements use a significant amount of current and energy.

The prior art shows the battery testers in series with the batteries. Unfortunately, this would result in measuring the $\int I^2_{\Delta\tau}$.

The prior art does not solve the problem of color changes in the time temperature indicating material when at room temperatures. This can give false readings unless the material is relatively insensitive at room temperatures. Drastic changes in ambient temperature may also present a false reading.

The object of the present invention provides a simple expiration indicator that addresses and solves these problems in a novel, inexpensive, reliable, and efficient way.

It is possible to design electrical circuits and displays to address this problem. However, the cost and complexity limits their application.

SUMMARY OF THE INVENTION

This present invention relates to a simple inexpensive label or indicator that can record and show the cumulative length of time an electrical device has been operated. Further, the device may also be able to show either heavy or light usage. The features and advantages of the present invention are explained below in reference to the figures.

DETAILED DESCRIPTION OF THE INVENTION

Figure 1:
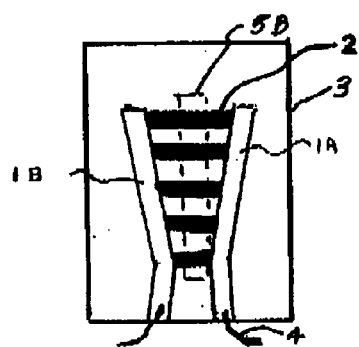
FIG. 1 shows the backside view of an expiration label made in accordance with the present invention.
Figure 2:
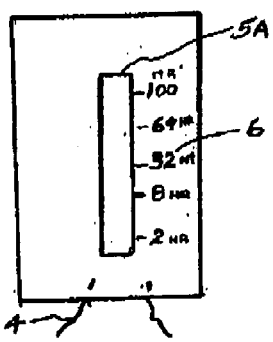
FIG. 2 shows a front side view of an expiration label made in accordance with the present invention.

Referring to FIGS. 1 and 2, the indicator comprises plurality variable length resistive heaters 2 in parallel connected at each end with non-parallel conductive Buss bars 4. The conductive elements can be printed on a polyester 3 film, such as Mylar or any other thermally stable substances, such as paper, polyimide, Lexan, etc. 3. The conductive materials 2 used as a heater can be purchased from Acheson Colloids or Dupont in the form of an ink to form a thick film carbon conductor that can be silk-screened printed, or rotogravure printed or sprayed to form the carbon conductive heater elements.

The conducting Buss bars 1A, 1B, which are printed over the carbon heater elements, can be purchased as an ink from Acheson or Dupont and are composed of silver particles in a binder that can also be printed (0.033 OHMS/□). Wires can be attached to the conductive silver using AMP connectors designed to pierce and crimp the film and make excellent electrical contact with the silver conductors. A dielectric coating over the conductors, except in the contact area, prevents shorting.

FIG. 2 shows the front view of the device. 5A is either a printed coating or adhesive strip of polydiacetylene produced by Temptime or Avery Dennison Corporation. It will be called Time Temperature Indicator or TTI material. Also shown is a scale calibrated in hours of use 6 at various increments. The TTI strip 5A will change color when heated with a sufficient time and temperature to give the appearance of a bar graph. It can be calibrated with the scale 6 to show the amount of use. In FIG. 1 at 5B the TTI is shown to be positioned over the heater elements.

Further discussion will show the precise interaction and function of these elements.

Figure 3:
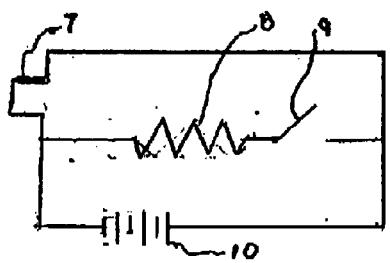
FIG. 3 shows how the expiration label may be placed in parallel with an electric device to record and show the amount of time used.

FIG. 3 shows the expiration label 7 in parallel with voltage or power source 10 and a load 8. The switch 9 would close, putting current through the load 8 and the indicator. The power source 10 can be a battery or A.C. source as the indicator integrates the RMS current and time. This is the preferred installation.

Figure 4:
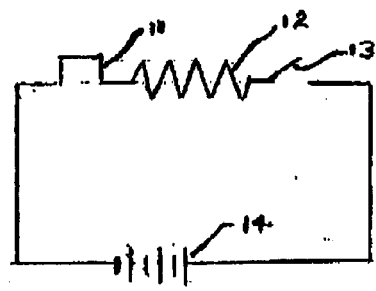
FIG. 4 shows how an expiration label may be placed in series with an electrical device to record and show the $\int I^2 dt$ or the cumulative current and time.

FIG. 4 shows the indicator in series with the power source. Here the indicator 11 must have a very small resistance compared with the load 12. When the switch 13 is closed, the power from source 14 will cause current to flow and the indicator to show $\int I^2 dt$. The power source may be A.C. or D.C.

Figure 5:
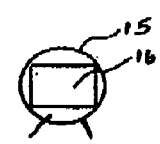
FIG. 5 shows an overcurrent protective device called a polyswitch with an irreversible time temperature indicator.

FIG. 5 shows a polyswitch current protecting device produced by Tyco 15 with a polydiacetylene coating or label on it 16. The polyswitch function and interaction with the indicator will be fully explained later. This device is always parallel as in FIG. 3.

Figure 6:
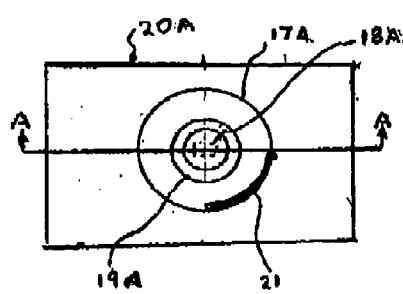
FIG. 6 shows a top view resistor surface mounted on a printed circuit board with a pressure sensitive TTI film over it and in contact with the board and resistor.

FIG. 6 shows a top view of a TTI label 17A that can be placed over a surface mounted resistor 18A and onto a circuit board 20A. It was found that a 230Ω resistor would heat above 65° C. when 11-volts was applied. By printing calibration circles on the TTI label, one can determine how long the heater was on. The center will go from red to black, with the black zone moving outward with more time. The outermost edge would not be greatly effected by the heating and would only change color if the ambient temperature had been elevated for prolonged periods. This can be used to determine if elevated ambient temperatures had biased the TTI indicator. A black passive color zone 21 will be used to color match and show when completion has been accomplished.

Figure 7:
FIG. 7 shows a side section view of a resistor and TTI film on a printed circuit board.
Figure 8:
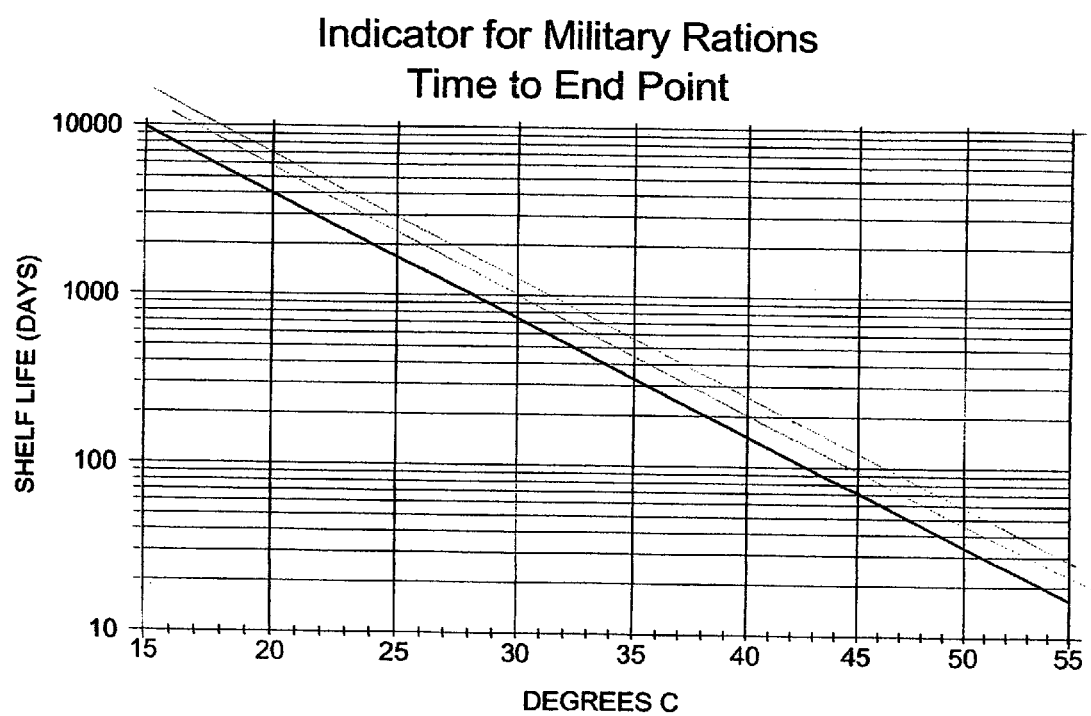
FIG. 8 shows the number of days versus the ambient temperature required to completely change the irreversible time temperature Thermochromic material.

FIG. 7 shows a cross-sectional view of the resistor 18B mounted on the printed circuit board 20B and the TTI film 18B Polydiacetylene polymers can be designed for various applications, such as reversible or irreversible temperature indicators. However, Temptime has developed a number of materials that will change color as function of time and temperature or TTI along an Arrhenius or Log Log Plot shown in FIG. 8.

This material changes from red to black when exposed to elevated temperatures for some period of time. It has been used by the military to determine when military rations have spoiled. For example, if the food has been stored at 20° C. it will spoil or degrade at the end of 4,000 days or about 11 years. Note however, that when heated to 55° C. the food will degrade in less than 20 days. It was found through experimentation one can heat this material to 70° C. and higher and have it go from red to black over some period of many hours. Other materials can be designed that are even more impervious to ambient temperatures and require higher temperatures for activation.

By use of a reversible thermochromic material in thermal contact with the printed heater element one can determine the applied voltage, because the temperatures will increase with increasing applied voltage. Shown below is the governing equation to determine the watt density and hence the temperature rise above ambient:

$$K\Delta T = Q = \frac{V^2}{L^2 P}$$

Where
Q=Watt Density (watts/IN$^2$)
L=Distance between electrodes or Buss bars IN
P=Sheet resistivity OHMS/☐
Δτ=Temperature rise
K=Constant for convective heat transfer When the resistive elements in the heater shown in FIG. 1 is in thermal contact with the irreversible time temperature material one may determine how long the heater stayed on at a given voltage.

Suppose we assume a power supply in FIG. 3 that is 8-volts; let us further assume a heater element spacing of 0.41" and a requirement to achieve a high temperature 70°–80° C. with 1.2 watt/IN$^2$ power density. We would then use a resistive ink that would give us a sheet resistivity of 333 OHMS/☐ (Carbon).

A heater with an electrode spacing that varied from 0.188 to 0.10 had an irreversible change from 2 to 100-hours when exposed to an eight-volt source. The carbon ink was deposited or printed so that it was about 300 OHMS/☐.

The device shown in FIG. 4 would be in series with the load and consequently be constructed of a much more conductive material so that it would be a small fraction of the load resistance. Typically the indicator can be constructed out of copper deposited on polyimide 1 to 2 micron and then etched to have a wedge shape or a small 0.1 OHM surface mounted resistor may be used.

In most applications, the sensing device should be suspended in air, so that it is not attached to some substrate that would be heated and effect the time temperature device.

Figure 9:
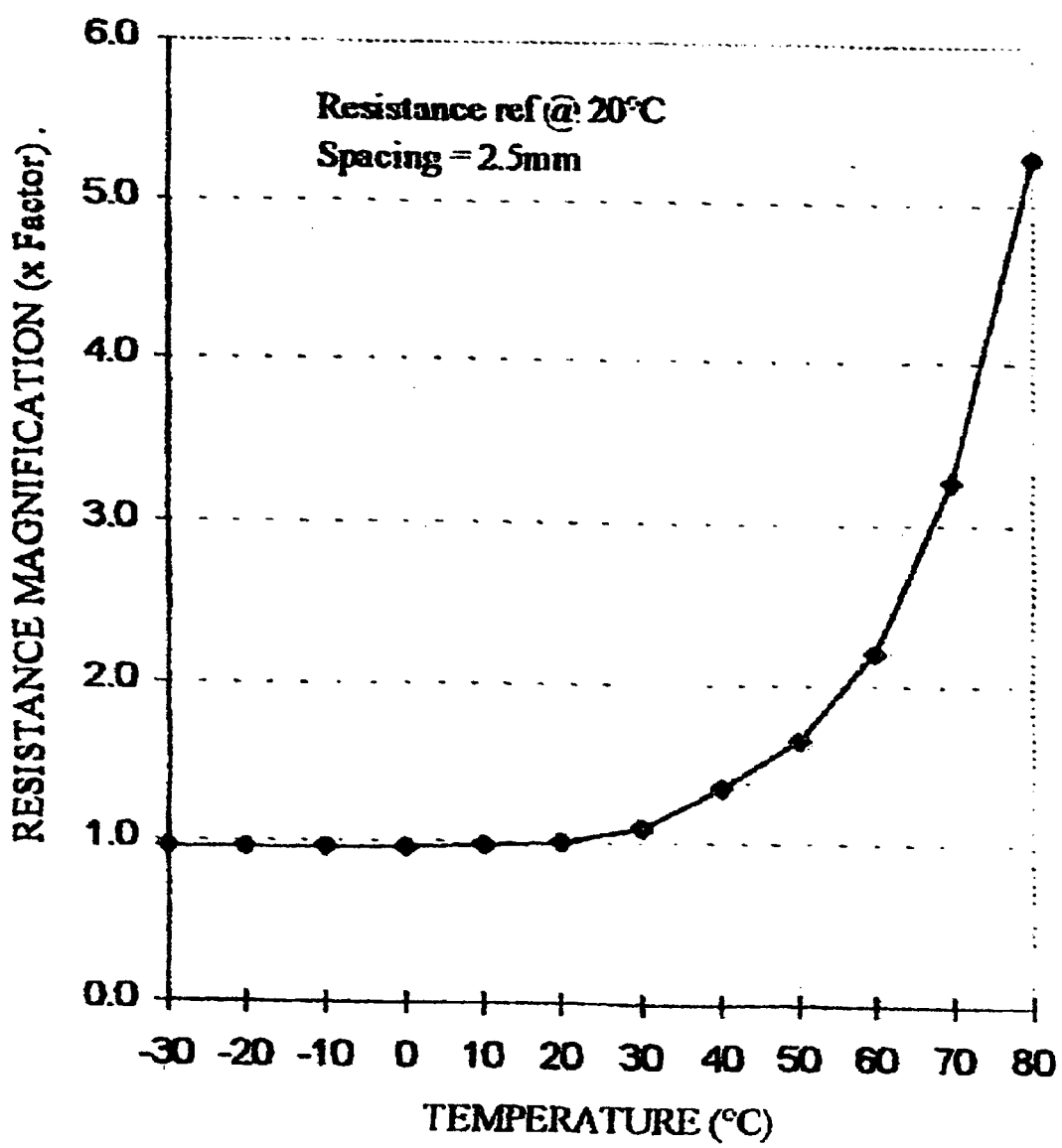
FIG. 9 shows the change in electrical resistance of a P.T.C. material at elevated temperatures.

Because there may be variations in the ambient temperature, a positive thermal coefficient (PTC) heater may be used. This is an ink produced by Dupont that increases conductivity with increasing temperature as shown in FIG. 9.

Using this ink to form the electrodes would compensate for shifts in the ambient temperature. As the ambient temperature rises, so would the resistance, which would help to maintain a constant temperatures.

In order to provide a constant temperature source, one may also use a polyswitch with a TTI material affixed to it. The polyswitch is used as on over-current protection device or a resetable fuse. It is composed of polymers loaded with carbon so they are conductive until they reach some elevated temperature and then the resistance dramatically increases so that the device maintains that temperature over various voltages and changes in ambient conditions.

Perhaps the simplest and easiest indicator is shown in FIG. 6 and FIG. 7. Here one may surface mount a thick film chip resistor such as those produced by Panasonic and the apply a TTI label with printed circles on it. This would minimize the cost of installation while providing an easy method for technicians to determine the usage of the device. More than one resistor can be used to give different times. In the case of instruments that have to be recalibrated periodically, one can either use the passive resistor concept and simply remove the label and reapply a fresh label after servicing some instrument. Other resistors may be used. The specific examples shown are for illustrative purpose only and are not intended to limit the scope of the invention as claimed.

I claim:

1. A device comprising a combination of an irreversible time temperature integrating thermochromic material that is not effected by ambient temperatures but changes color in minutes or hours at elevated above ambient temperatures, and an electrical resistive heating element, wherein the electrical resistive heating element is a part of an external electric circuit connected in parallel to AC or DC electrical device;

wherein said electrical device is an electrical appliance;

wherein said electrical resistive heating element is an electric polyswitch circuit protection device made from polymers loaded with carbon, said electric polyswitch circuit protection device being conductive until reaching an elevated temperature and then becoming resistive so as the device maintains said constant elevated temperature over large various voltages and changes in ambient conditions; and wherein the device further comprises a calibration scale instantaneously visually recording and displaying a usage time of said electrical appliance.

2. A device comprising a combination of an irreversible time temperature integrating thermochromic material that is not effected by ambient temperatures but changes color in minutes or hours at elevated above ambient temperatures, and an electrical resistive heating element, wherein the electrical resistive heating element is a part of an external electric circuit connected in parallel to AC or DC electrical device;

wherein said electrical device is an electrical appliance;

wherein said electrical resistive heating element is printed with stable carbon ink in thermal contact with the thermochromic material;

wherein said electrical heating element comprising a plurality of variable length resistive heating elements connected at each end with non parallel conductive buss bars operating at a plurality of elevated temperatures;

wherein the resistive heating elements are printed from positive thermal coefficient resistive ink to provide such said electrical resistive heating element that will maintain a constant elevated temperature at large changes in ambient temperature;

wherein the device further comprises a calibration scale instantaneously visually recording and displaying a usage time of said electrical appliance.

* * * * *